United States Patent
Moore

[19]

[11] Patent Number: 6,030,160
[45] Date of Patent: Feb. 29, 2000

[54] AUTOMOTIVE STORAGE NET AND EDGE-MOUNTED CLIP FOR INSTALLATION THEREOF

[75] Inventor: Donal Moore, Birmingham, Mich.

[73] Assignee: Polytech Netting, L.P., Troy, Mich.

[21] Appl. No.: 08/980,085

[22] Filed: Nov. 26, 1997

[51] Int. Cl.⁷ ..................................................... B60P 7/08
[52] U.S. Cl. ......................... 410/118; 410/116; 410/106; 410/129; 410/97
[58] Field of Search ..................................... 410/117, 118, 410/129, 140, 116, 106, 110, 96, 97; 224/42.34, 572, 404, 563, 925; 24/115 K, 265 CD; 87/2; 296/37.1, 37.5, 37.6

[56] References Cited

U.S. PATENT DOCUMENTS

| | | |
|---|---|---|
| 942,366 | 12/1909 | Deeter . |
| 2,148,847 | 2/1939 | Wiley . |
| 2,854,931 | 10/1958 | Campbell ................................. 410/118 |
| 3,438,673 | 4/1969 | Nelson ................................ 410/117 X |
| 4,692,969 | 9/1987 | Johnson . |
| 5,121,958 | 6/1992 | Goeden et al. ..................... 410/117 X |
| 5,186,587 | 2/1993 | Moore .................................... 410/118 |
| 5,340,004 | 8/1994 | Moore . |
| 5,416,956 | 5/1995 | Rubin ................................. 410/116 X |
| 5,452,973 | 9/1995 | Arvin ...................................... 410/118 |
| 5,542,591 | 8/1996 | Moore et al. ....................... 224/563 X |
| 5,553,981 | 9/1996 | Braden .................................... 410/116 |
| 5,628,442 | 5/1997 | Wayne ............................. 224/42.34 X |
| 5,716,176 | 2/1998 | Anderson ............................... 410/118 |
| 5,876,167 | 3/1999 | Selby ....................................... 410/97 |

FOREIGN PATENT DOCUMENTS

| | | | |
|---|---|---|---|
| 536923 A1 | 4/1993 | European Pat. Off. ............... | 224/568 |
| 2-72142 | 12/1983 | Japan . | |
| 93/22161 | 11/1993 | WIPO .................................. | 224/563 |

*Primary Examiner*—Stephen T. Gordon
*Attorney, Agent, or Firm*—Young & Basile, P.C.

[57] ABSTRACT

A net type cargo storage system is for use within a motor vehicle having a trunk, a trunk opening periphery being formed from sheet metal, and a trunk seal extending thereabout. The storage system comprises an automotive storage net member having an in-use length, opposed upper side areas, a storage area for receiving cargo, and a mounting member disposed on each of the upper side areas. Two clips each comprise a body having a first end and a second end, the first end being formed in a U-shape mounted over the trunk opening periphery sheet metal and beneath the trunk seal. A mechanism is disposed on the body for lockingly engaging the clip to the trunk opening. An attachment member is disposed on the body second end and within the trunk, the attachment member being matingly and releasably engageable with the net member mounting member. The two clips are opposedly spaced at a distance accommodating mounting of the storage net member at its in-use length.

13 Claims, 3 Drawing Sheets

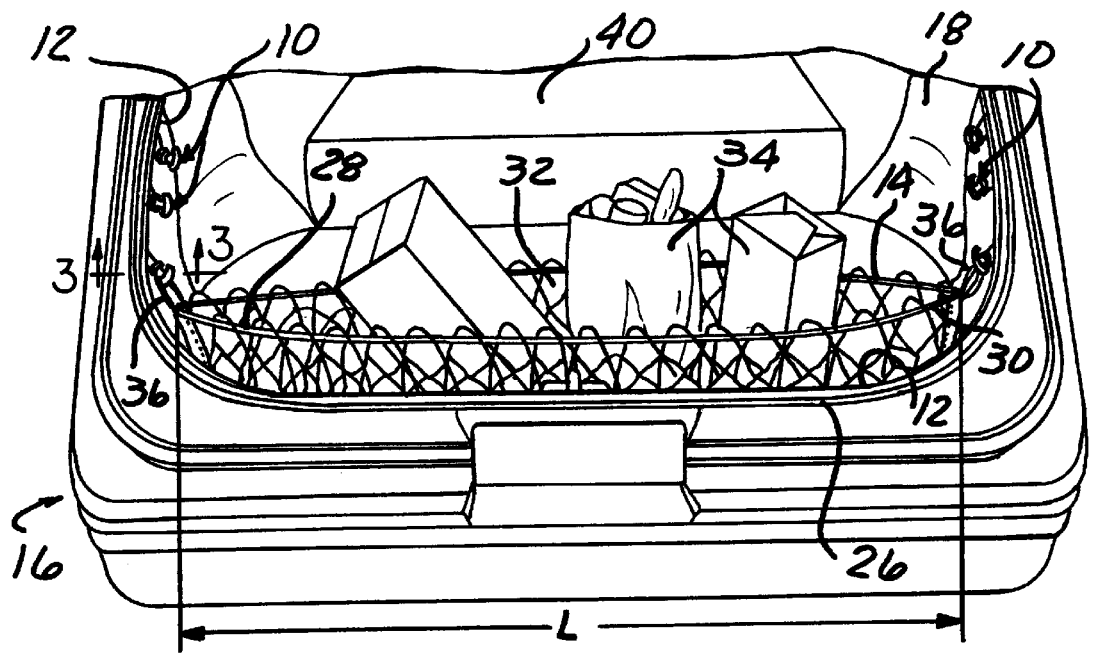
FIG-1
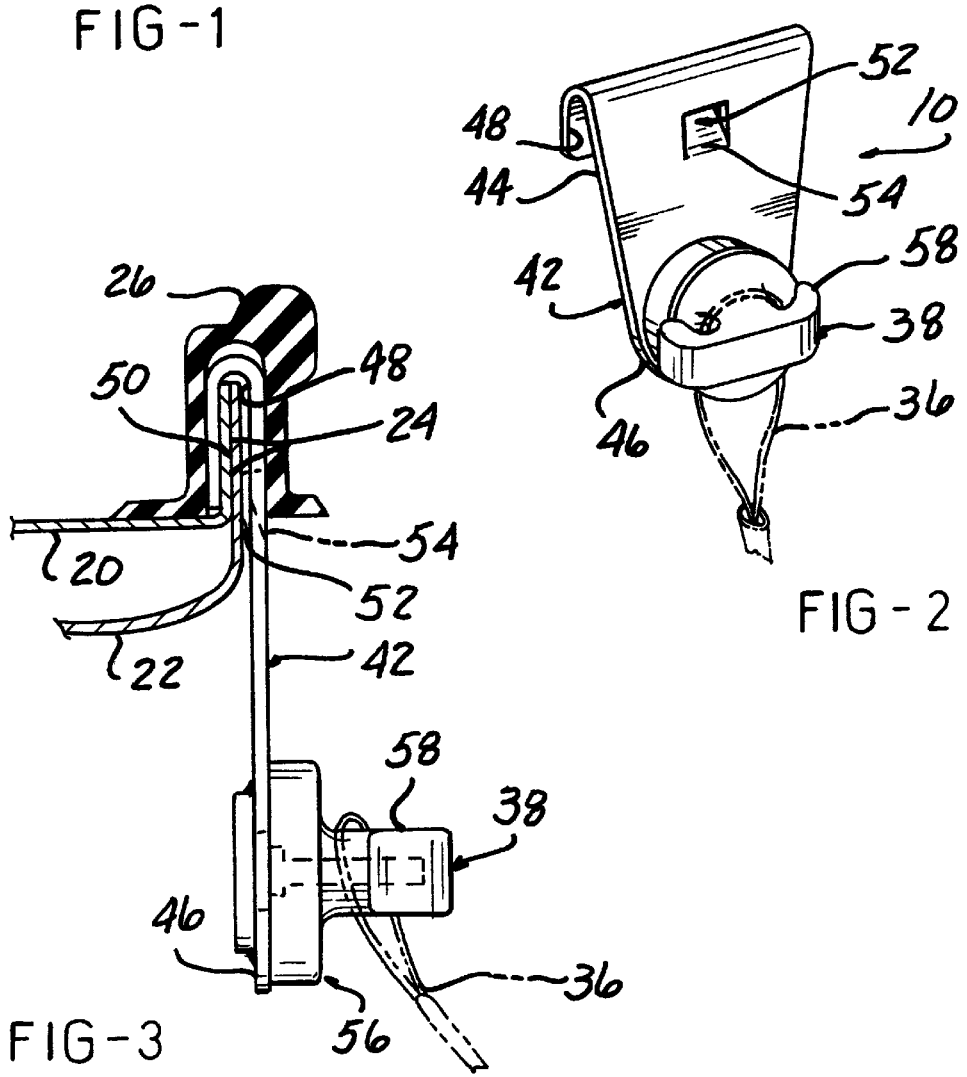
FIG-2
FIG-3

6,030,160

AUTOMOTIVE STORAGE NET AND EDGE-MOUNTED CLIP FOR INSTALLATION THEREOF

BACKGROUND OF THE INVENTION

The present invention relates generally to automotive storage and load retention nets, and more particularly to such nets which are mounted relative to a trunk opening by means of edge-mounted clips.

Consumers continually seek more efficient, convenient and versatile ways to transport contents such as cargo to be stowed in a motor vehicle such as a sedan. Conventional means of stowage/cargo transport has consisted mainly in the non-compartmentalized trunk space of the sedan. This means has served its purpose satisfactorily, however, several drawbacks exist.

One disadvantage is that the cargo is freely movable within the stowage compartment such as the trunk, and can be damaged in the event of a sudden stop. Even if cargo is not damaged but rolls toward the back of the trunk, persons of smaller stature have a difficult time retrieving it. Further, it is difficult to transport a mixture of heavy items with more delicate or fragile items in one large compartment.

Automotive storage nets such as that disclosed in U.S. Pat. No. 5,340,004 solve the above-mentioned problems. However, in order to install these type of nets within the stowage transport area, it is necessary to modify the trunk area to provide the attachment points for the nets. This modification could take place either at the OEM (original equipment manufacturer) level, or as an after market modification.

Thus, it is an object of the present invention to provide a clip for mounting an automotive storage net within a trunk, which clip is advantageously mountable on the trunk opening without modification of the trunk area. It is a further object of the present invention to provide such a clip which is simple and economical to manufacture. Yet further, it is an object of the present invention to provide a clip which is easy to install, either by the OEM, an after market supplier, or the consumer. Yet still further, it is an object of the present invention to provide such a clip which, while being easy to install, strongly resists disengagement from, or movement about the trunk opening, thus advantageously securing the automotive storage net in a desired location. Still further, it is an object of the present invention to provide such a clip which may be installed at any desired location in the trunk opening and in any desired number so as to mount one or several automotive storage nets at any desired location.

SUMMARY OF THE INVENTION

The present invention addresses and solves the above-mentioned problems and meets the enumerated objects and advantages, as well as others not enumerated, by providing a net type cargo storage system for use within a motor vehicle having a trunk, a trunk opening having a periphery, the trunk opening periphery being formed from sheet metal, a trunk seal extending about the trunk opening periphery, with the seal engaged over the sheet metal. The storage system comprises an automotive storage net member having an in-use length, opposed upper side areas, a storage area for receiving cargo, and a mounting member disposed on each of the upper side areas. Two clips each comprise a body having a first end and a second end, the first end being formed in a U-shape mounted over the trunk opening periphery sheet metal and beneath the trunk seal. Means are disposed on the body for lockingly engaging the clip to the trunk opening. An attachment member is disposed on the body second end and within the trunk, the attachment member being matingly and releasably engageable with the net member mounting member. The two clips are opposedly spaced at a distance accommodating mounting of the storage net member at its in-use length.

A method for installing the net type cargo storage system comprises the steps of:

sliding a U-shaped end of two clips over the trunk opening sheet metal to lockingly engage each clip to the trunk opening by a barb angularly oriented outwardly from each clip and toward the sheet metal so as to frictionally engage the sheet metal;

placing the trunk seal over each clip U-shaped end; and attaching the automotive cargo storage net member to the trunk by releasably mounting the net member to the attachment member disposed on an end of each of the clips opposed to the U-shaped end.

BRIEF DESCRIPTION OF THE DRAWINGS

Other objects, features and advantages of the present invention will become apparent by reference to the following detailed description and to the drawings, in which:

FIG. 1 is a cutaway perspective view of a sedan trunk, showing six clips installed, two of which have an automotive storage net mounted therebetween with cargo shown therein;

FIG. 2 is an enlarged perspective view of the clip of the present invention, showing an elastic loop member in phantom around the tie-down anchor hook member, with the remainder of the storage net cutaway; and FIG. 3 is a cross sectional view taken on line 3—3 of FIG. 1, showing the two pieces of sheet metal spot welded together and the trunk seal over the U-shaped end of the clip;

DETAILED DESCRIPTION OF THE PREFERRED EMBODIMENTS

Figure 4:
FIG. 4 is an exploded perspective view of an alternate embodiment of the tie-down hook member, showing a cutaway view of the clip in phantom.

Referring now to FIG. 1, an automotive storage net 14 is mounted relative to the trunk 18 of a motor vehicle 16 by means of two opposedly mounted clips 10.

More specifically, motor vehicle 16 has a trunk 18, a trunk opening 12 having a periphery, the trunk opening 12 periphery being formed from sheet metal, which periphery generally may be formed from at least two sheets of metal 20, 22 spot welded 24 together, as best seen in FIG. 3. A trunk seal 26 extends about the trunk opening 12 periphery, with the seal 26 being engaged over the sheet metal 20, 22.

The net type cargo storage system of the present invention comprises an automotive storage net member 14 having an in-use length L, opposed upper side areas 28, 30, a storage area 32 for receiving cargo 34, and a mounting member disposed on each of the upper side areas 28, 30.

It is to be understood that the mounting member may comprise any suitable means, however, in the preferred embodiment, the mounting member comprises either an elastic loop member 36 or a hook member 38. In the more preferred embodiment, the mounting member comprises elastic loop member 36.

It is to be understood that the storage net member 14 may comprise any suitable netting member, which member 14 will be tensioned tightly when attached between two opposed clips 10, so as to prevent cargo 34 escaping therefrom. Illustrative, non-limiting examples of various netting members 14 are disclosed in U.S. Pat. No. 5,340,004, which is incorporated herein by reference. Some examples of suitable materials from which net member 14 may be formed include, but are not limited to: a woven nylon netting material or other natural or synthetic material, as shown in FIG. 1; a woven or non-woven virtually opaque material from either natural or synthetic materials; and a flexible solid or perforated member formed from a suitable polymeric, metallic, natural or synthetic material, for example a vinyl material or a canvas material. When not desired for use, net member 14 may be easily detached from clips 10, and rolled away for quick and convenient storage.

The versatile compartmentalizing feature of the present invention is shown in FIG. 1 wherein certain cargo 34 is stowed in automotive storage net member 14, while larger cargo 40 is stowed in a back area of trunk 18.

As best seen in FIGS. 2 and 3, clip 10 comprises a body 42 having a first end 44 and a second end 46, the first end 44 being formed in a U-shape 48 mounted over the trunk opening 12 periphery sheet metal 20, 22 spot welded portion 50. The U-shaped portion 48 is mounted beneath trunk seal 26.

Clip 10 further comprises means, disposed on the body 42, for lockingly engaging clip 10 to trunk opening 12. It is to be understood that this locking engaging means may comprise any suitable means, however, in the preferred embodiment, this locking engaging means comprises a barb 52 having a surface 54 angularly oriented toward the sheet metal 50 so as to frictionally engage sheet metal 50 and resist disengagement of clip 10 from trunk opening 12. The angular orientation of surface 54 allows for easy mounting of clip 10 onto sheet metal 50, yet strongly resists removal, as well as translational or rotational movement of clip 10. Barb 52 is shown in the center of body 42 in FIG. 2; however, it is to be understood that barb 52 could be at the far right or far left of the body 42, as well as at any point intermediate these two ends.

Clip 10 may further comprise an attachment member 56 disposed on the body second end 46 and within trunk 18 (when the clip 10 is installed within the trunk 18), attachment member 56 being matingly and releasably engageable with the net member 14 mounting member.

Figure 6:
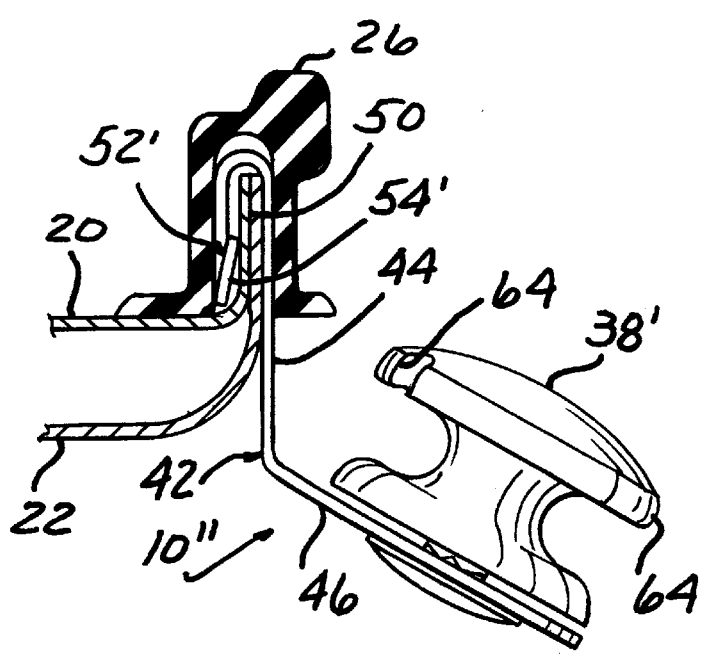
FIG. 6 is a view similar to FIG. 3, but showing a second alternate embodiment of the clip.

It is to be understood that the clip attachment member 56 may comprise any suitable means. However, in the preferred embodiment, attachment member 56 comprises either a hook member 38 or an elastic loop member 36, the hook member 38 or the loop member 36 being chosen so as to matingly engage with the mounting member on the net 14. In the more preferred embodiment, the attachment member 56 comprises hook member 38; and still more preferred, hook member 38 comprises a tie-down anchor 58 which may be attached by welding or other suitable means to body 42. As shown in FIG. 4, tie-down anchor 58' is attached to body 42 by a suitable bolt 60 and nut 62. An alternate hook member 38' having gripping slots 64 formed therein is shown in FIG. 6.

Figure 5:
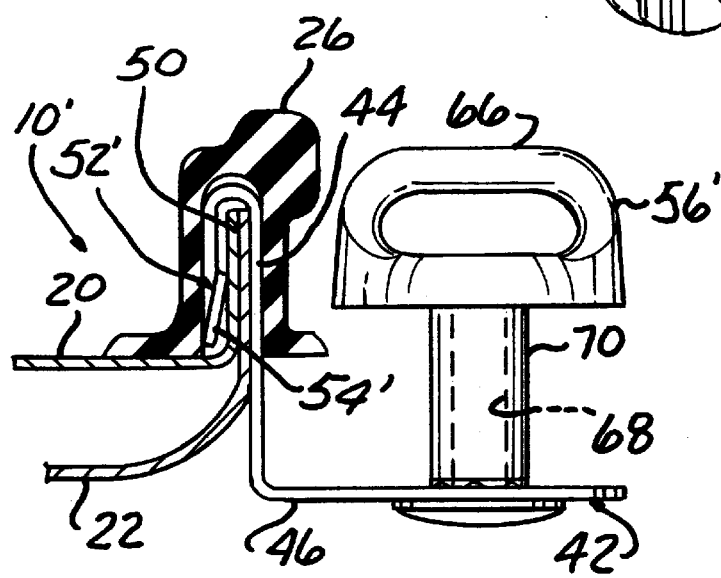
FIG. 5 is a view similar to FIG. 3, but showing an alternate embodiment of the clip.
Figure 7:
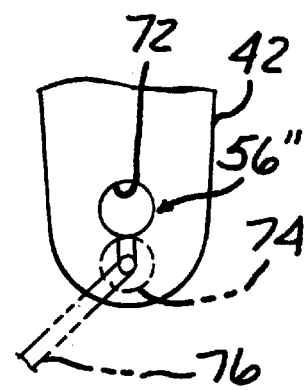
FIG. 7 is a cutaway front view of the clip, showing a keyhole slot/socket in the clip, and, in phantom, a mating key member locked within the slot.
Figure 8:
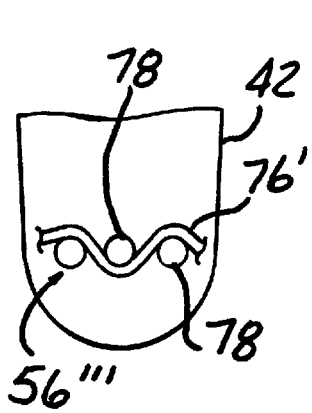
FIG. 8 is a cutaway front view of the clip, showing a locking peg arrangement and a cutaway portion of the elastic cord frictionally engaged thereabout.

Other suitable attachment members 56', 56" and 56''' are shown in FIGS. 5, 7 and 8, respectively. Attachment member 56' comprises a plastic or metal loop member 66 attached to clip body 42 by any suitable means, such as by a threaded screw 68. Loop member 66 may receive a mounting member, such as a hook member (not shown) disposed on each of the upper side areas 28, 30 of the net 14. Further, necked down portion 70 of attachment member 56' may be used to retain an elastic loop member 36.

Referring now to FIG. 7, attachment member 56" comprises a keyhole slot/socket 72 which lockingly and releasably engages a mounting member, such as a key member 74 attached to an end of an elastic cord 76, disposed on each of the upper side areas 28, 30 of the net 14. In FIG. 8, attachment member 56''' comprises a locking peg arrangement comprising three pegs 78. A mounting member, such as elastic cord 76' disposed on each of the upper side areas 28, 30 of the net 14, is frictionally engaged thereabout. In this manner, the net 14 may be made as taut or as loose as desired. The material(s) from which the pegs 78 and cord 76' are formed should preferably be chosen so as to have desirable frictional characteristics for suitable locking engagement.

Figure 11:
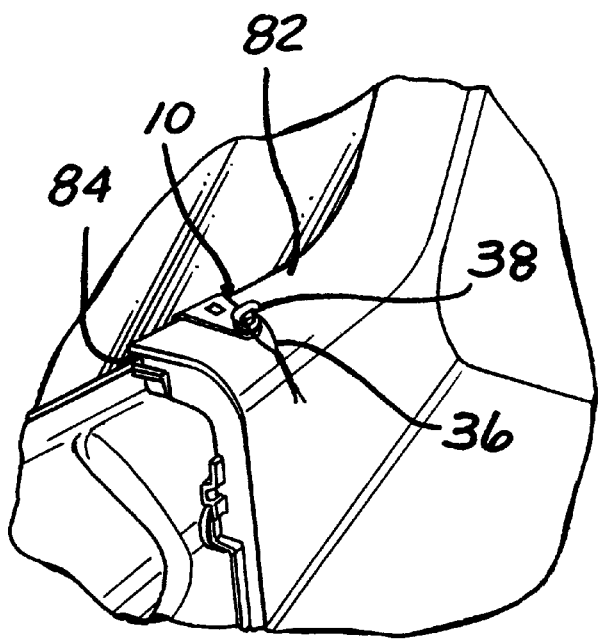
FIG. 11 is a perspective view showing an alternate attachment of the clip of the present invention.

Referring now to FIG. 11, the embodiment of clip 10 shown in FIGS. 2 and 3 (and FIG. 9, in the position wherein the angular offset between first end 44 and second end 46 is substantially 180 degrees, ie. virtually straight), wherein the angular offset between first end 44 and second end 46 is substantially 180 degrees, ie. virtually straight (contrary to the embodiment disclosed hereinbelow), may be particularly useful in motor vehicles such as sports utility vehicles, mini vans and station wagons. In these vehicles, clip 10 may be edge mounted next to the side glass windows in the cargo area, over the hard polymeric trim 82 which covers the window edge. The trim 82 generally has a U-shaped groove 84, and the first end 44 U-shape 48 complementarily and lockingly fits over the upper leg of groove 84.

An alternate embodiment of the clip is designated generally as 10' in FIG. 5. In this embodiment, first end 44 of clip 10' is angularly offset from second end 46 by about 90°. This embodiment may be preferred if the vehicle has a lip (not shown) formed about the trunk opening 12; in this manner, clip 10' will not interfere with the trunk lip, and may receive additional support as second end 46 is seated within the lip. It is to be understood that the angular offset may be at any angle, as desired, such as 135°, 150°, or any angle between about 90° and about 180°. Although less desired, the angular offset could also be at an angle less than about 90°, or slightly larger than about 180°. A second alternate embodiment 10" is shown in FIG. 6—in this embodiment, the angular offset is about 120°. It is to be understood that the necked down portion 70 as shown in FIG. 5 is somewhat exaggerated, in that attachment member 56' may be substantially flush with second end 46 of clip body 42.

In both of the embodiments 10', 10" shown in FIGS. 5 and 6, the locking engaging means comprises two opposed barbs 52' (only one may be seen in the Figs., but the opposed barb 52' is the mirror image of the barb 52' depicted), one barb 52' at each of the outer edges of body 42. Each barb 52' has a surface 54' angularly oriented toward the sheet metal 50 so as to frictionally engage sheet metal 50 and resist disengagement of clip 10', 10" from trunk opening 12. The angular orientation of surface 54' allows for easy mounting of clip 10', 10" onto sheet metal 50, yet strongly resists removal, as well as translational or rotational movement of clip 10', 10".

Figure 9:
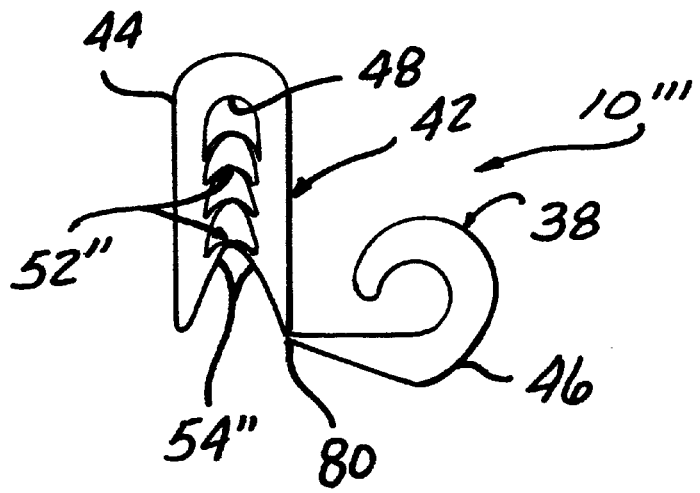
FIG. 9 is a side view of a third alternate embodiment of the clip.
Figure 10:
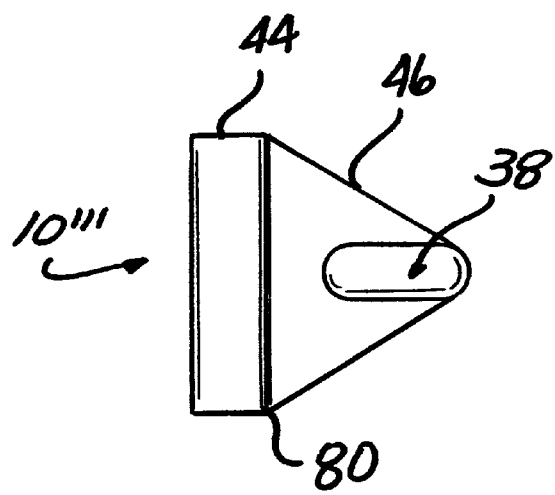
FIG. 10 is a top view of the clip of FIG. 9.

Referring now to FIGS. 9 and 10, a third alternate embodiment of the clip is designated generally as 10'". In this embodiment, the clip 10'" is formed from a suitable, flexibly rigid polymeric material, such as an engineered plastic material. In this embodiment, first end 44 of clip 10'" may be angularly offset from second end 46 by any angle between about 90° and about 180° via a living hinge 80. Second end 46 terminates in a hook member 38. The entire clip 10'", including hook member 38, may be integrally molded by any suitable molding method.

This embodiment may be preferred if the vehicle has a lip (not shown) formed about the trunk opening 12; in this manner, clip 10'" may comprise an angular offset which will not interfere with the trunk lip, and may receive additional support as second end 46 is seated within the lip. When the offset of this embodiment is closer to or at 180° (substantially straight), this embodiment may also be preferred in motor vehicles such as sports utility vehicles, mini vans and station wagons. In these vehicles, clip 10'" may be edge mounted next to the side glass windows in the cargo area, between the glass and over the hard polymeric trim 82 which covers the window edge (as shown in FIG. 11).

In the embodiment 10'" shown in FIGS. 9 and 10, the locking engaging means comprises a plurality of barbs 52" on each of the opposed surfaces of U-shaped 48 first end 44. The barbs 52" on one of the opposed surfaces may be substantially the mirror image of the barbs 52" on the other of the opposed surfaces. Each barb 52" has a surface 54" angularly oriented toward the sheet metal 50 so as to frictionally engage sheet metal 50 and resist disengagement of clip 10'" from trunk opening 12. The angular orientation of surface 54" allows for easy mounting of clip 10'" onto sheet metal 50, yet strongly resists removal, as well as translational or rotational movement of clip 10'". In addition to other advantages mentioned herein, clip 10'" is advantageous in that it may be more lightweight than the other embodiments disclosed herein, as well as being simple to manufacture and install.

As shown in FIG. 1, two clips 10 (and/or 10', 10", 10'") are opposedly spaced at a distance accommodating mounting of the storage net member 14 at its in use length L. One net 14 is shown mounted in FIG. 1, however, a plurality of nets 14 may be mounted in a single trunk; the exemplary number of clips 10 shown could accommodate up to three nets 14. Also, although net 14 is shown horizontally mounted in FIG. 1, it is to be understood that net 14 may be mounted diagonally if desired, or vertically along the sides of the trunk opening 12, as desired.

A method according to the present invention for installing a net type cargo storage system into a motor vehicle 16 comprises the step of sliding a U-shaped end 48 of two clips 10 over the trunk opening sheet metal 50 to lockingly engage each clip 10 to the trunk opening 12 by a barb 52 angularly oriented outwardly from each clip 10 and toward the sheet metal 22 so as to frictionally engage the sheet metal 22, 50. It is to be understood that this method applies equally well to any and/or all of the embodiments 10, 10', 10", 10'" disclosed herein.

The method further comprises the step of placing the trunk seal 26 over each clip U-shaped end 48. This clip 10 may be installed over the trunk opening 12 at the OEM, after which the trunk seal 26 would be installed by any conventional means, for example, with a suitable adhesive. If clip 10 is installed after market or by the consumer, seal 26 is easily lifted at the desired location, clip 10 is installed as described hereinabove, and seal 26 is easily and quickly replaced over clip 10.

The method may further comprise the step of attaching an automotive cargo storage net member 14 having an in-use length L to the trunk 18 by releasably mounting net member 14 to an attachment member 56 disposed on an end 46 of each of the clips 10 opposed to the U-shaped end 48.

Further, the method may comprise the step of engaging a plurality of clips 10 at desired locations about the trunk opening 12 periphery, the clips 10 being adapted to releasably engage a corresponding plurality of automotive cargo storage net members 14. The attachment of the net member 14 to the clips 10 may be accomplished by any suitable means. However, in the preferred embodiment, this attachment means is as described hereinabove in relation to the net member mounting members and the attachment members 56.

In the preferred embodiment, clip body 42, including barb 52, is formed from a metal material, while hook member 38 is formed from a suitably rigid polymeric material, for example engineered plastic. However, it is to be understood that all components of clip 10 may be formed from any suitable material, and may be integrally formed therefrom, or hook member 38 and clip body 42 may be formed separately and attached by any suitable means, as by welding. Further, it is to be understood that barb 52 may also be formed from a suitable engineered plastic.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A motor vehicle having a trunk, a trunk opening having a periphery, the trunk opening periphery being formed from sheet metal, a trunk seal extending about the trunk opening periphery, the seal engaged over the sheet metal, and a net type cargo storage system, the storage system comprising:
   an automotive storage net member having an in-use length, opposed upper side areas, a storage area for receiving cargo, and a mounting member disposed on each of the upper side areas; and
   two clips, each clip comprising:
   a body having a first end and a second end, the first end being formed in a U-shape mounted over the trunk opening periphery sheet metal and beneath the trunk seal;
   means, disposed on the body, for lockingly engaging the clip to the trunk opening; and
   an attachment member disposed on the body second end and within the trunk, the attachment member matingly and releasably engageable with the net member mounting member;
   wherein the two clips are opposedly spaced at a distance accommodating mounting of the storage net member at its in-use length.

2. The motor vehicle as defined in claim 1 wherein the lockingly engaging means comprises a barb angularly oriented toward the sheet metal so as to frictionally engage the sheet metal and resist disengagement of the clip from the trunk opening.

3. The motor vehicle as defined in claim 1 wherein the trunk opening periphery sheet metal comprises at least two sheets of metal spot welded together.

4. The motor vehicle as defined in claim 1 wherein the storage net member mounting member comprises one of an elastic loop member and a hook member.

5. The motor vehicle as defined in claim 4 wherein the clip attachment member comprises the other of the hook member and the elastic loop member.

6. The motor vehicle as defined in claim 1, further comprising additional ones of the clips engaged at desired locations about the trunk opening periphery, and adapted to releasably engage corresponding automotive storage net members in addition to the net member.

7. The motor vehicle as defined in claim 1 wherein the first end of the clip body is angularly offset from the second end of the clip body.

8. The motor vehicle as defined in claim 7 wherein the angular offset is about 90°.

9. A motor vehicle having a trunk, a trunk opening having a periphery, the trunk opening periphery being formed from at least two sheets of metal spot welded together, a trunk seal extending about the trunk opening periphery, the seal engaged over the two sheets of metal, and a net type cargo storage system, the storage system comprising:

an automotive storage net member having an inuse length, opposed upper side areas, a storage area for receiving cargo, and an elastic loop member disposed on each of the upper side areas; and two clips, each clip comprising:

a body having a first end and a second end, the first end being formed in a U-shape mounted over the trunk opening periphery sheets of metal and beneath the trunk seal;

means, disposed on the body, for lockingly engaging the clip to the trunk opening, wherein the lockingly engaging means comprises a barb adjacent the first end and angularly oriented toward the sheet metal so as to frictionally engage the sheet metal and resist disengagement of the clip from the trunk opening; and a hook member disposed on the body second end and within the trunk, the hook member matingly and releasably engageable with one of the elastic loop members;

wherein the two clips are opposedly spaced at a distance accommodating mounting of the storage net member at its in-use length.

10. The motor vehicle as defined in claim 9 wherein the hook member is a tie-down anchor.

11. The motor vehicle as defined in claim 9 wherein the first end of the clip body is angularly offset from the second end of the clip body by an angle of about 90°.

12. A clip for edge mounting to a motor vehicle trunk opening, the motor vehicle having a trunk, the trunk opening having a periphery being formed from sheet metal, a trunk seal extending about the trunk opening periphery, the seal engaged over the sheet metal, the clip adapted to retain an automotive storage net member within the trunk, the storage net member having opposed upper side areas, a storage area for receiving cargo, and a mounting member disposed on each of the upper side areas; the clip comprising:

a body having a first end and a second end, the first end being formed in a U-shape adapted to be mounted over the trunk opening periphery sheet metal and beneath the trunk seal;

means, disposed on the body, adapted to lockingly engage the clip to the trunk opening, wherein the lockingly engaging means comprises a barb adapted to be angularly oriented toward the sheet metal so as to be adapted to frictionally engage the sheet metal and resist disengagement of the clip from the trunk opening; and an attachment member disposed on the body second end, the attachment member adapted to matingly and releasably engage with one of the net member mounting members.

13. The clip as defined in claim 12 wherein the first end of the clip body is angularly offset from the second end of the clip body.

* * * * *